US012670649B2

(12) United States Patent
Gorumkonda et al.

(10) Patent No.: US 12,670,649 B2
(45) Date of Patent: Jun. 30, 2026

(54) OBJECT SCALE UTILIZING AWAY-FACING IMAGES

(71) Applicant: Snap Inc., Santa Monica, CA (US)

(72) Inventors: Gurunandan Krishnan Gorumkonda, Kirkland, WA (US); Rui Yu, State College, PA (US); Yicheng Wu, Boston, MA (US); Jian Wang, Pittsburgh, PA (US); Sizhuo Ma, Madison, WI (US)

(73) Assignee: Snap Inc.

( * ) Notice: Subject to any disclaimer, the term of this patent is extended or adjusted under 35 U.S.C. 154(b) by 213 days.

(21) Appl. No.: 18/421,241

(22) Filed: Jan. 24, 2024

(65) Prior Publication Data

US 2025/0238994 A1      Jul. 24, 2025

(51) Int. Cl.
| | |
|---|---|
| *G06T 15/00* | (2011.01) |
| *G06T 7/60* | (2017.01) |
| *G06T 7/73* | (2017.01) |
| *G06T 7/80* | (2017.01) |
| *G06T 19/00* | (2011.01) |

(52) U.S. Cl.
CPC ................ *G06T 15/00* (2013.01); *G06T 7/60* (2013.01); *G06T 7/75* (2017.01); *G06T 7/85* (2017.01); *G06T 19/006* (2013.01); *G06T 2207/30201* (2013.01); *G06T 2207/30244* (2013.01)

(58) Field of Classification Search
CPC .. G06T 7/60; G06T 7/70; G06T 15/00; G06T 19/006
See application file for complete search history.

(56) References Cited

U.S. PATENT DOCUMENTS

2023/0410344 A1* 12/2023 Turner ................... H04N 23/80

FOREIGN PATENT DOCUMENTS

EP            3323109 B1 *   3/2022   ............. H04N 23/61

OTHER PUBLICATIONS

Abdelhamed, A. et al. "Leveraging the availability of two cameras for illuminant estimation." In Proceedings of the IEEE/CVF Conference on Computer Vision and Pattern Recognition (CVPR), pp. 6637-6646, 2021.
Amcon. Amcon Digital Pupilometer User's Manual EQ-6310, 2023.
BeReal SAS. BeReal, 2023. Accessed May 1, 2023. https://bere.al/en.
Bergmanson, J. P. et al. Size does matter: what is the corneo-limbal diameter? Clinical and Experimental Optometry, 100(5):522-528, 2017.

(Continued)

*Primary Examiner* — Charles Tseng
(74) *Attorney, Agent, or Firm* — CM Law; Stephen J. Weed

(57)      ABSTRACT

Methods, systems, mobile devices, and non-transitory computer-readable mediums for determining a scale of an object with a mobile device. The mobile device includes at least one object-facing camera (e.g., a monocular camera) and an away-facing stereo camera system. Information captured using the away-facing stereo camera system is used to estimate relative pose information for determining the scale of the object in images captured by the object-facing camera. The proposed system leverages the scene images surrounding the mobile device to resolve scale ambiguity and calculate the absolute scale.

20 Claims, 9 Drawing Sheets

(56) References Cited

OTHER PUBLICATIONS

Bouguet, J.-Y. Camera calibration toolbox for matlab. http://robots.stanford.edu/cs223b04/JeanYvesCalib, 2004.

Cao, C. et al. Authentic volumetric avatars from a phone scan. ACM Transactions on Graphics (TOG), 41(4):1-19, 2022.

Cheng, D. et al., Learning scene illumination by pairwise photos from rear and front mobile cameras. In Computer Graphics Forum, vol. 37, pp. 213-221, 2018.

Cvisic, I. et al. SOFT2: Stereo Visual Odometry for Road Vehicles Based on a Point-to-Epipolar-Line Metric. IEEE Transactions on Robotics, 2022.

Diamond, R. A note on the rotational superposition problem. Acta Crys-tallographica Section A: Foundations of Crystallography, 44(2):211-216, 1988.

Duane, C. B . . . Close-range camera calibration. Photogramm. Eng, 37(8):855-866, 1971.

Fanelli, G. et al. Random forests for real time 3d face analysis. International Journal of Computer Vision (IJCV), 101 (3):437-458, 2013.

Feng, Y. et al. Joint 3d face reconstruction and dense alignment with position map regression network. In Proceedings of the European Conference on Computer Vision (ECCV), pp. 534-551, 2018.

GSMArena.com. Gsmarena phone finder, 2023. Accessed May 1, 2023. https://www.gsmarena.com/results.php3?nYearMin=2022.

Guo, J. et al. Towards fast, accurate and stable 3d dense face alignment. In Proceedings of the European Conference on Computer Vision (ECCV), pp. 152-168. Springer, 2020.

Ham, C. et al. Absolute scale estimation of 3d monocular vision on smart devices. In Mobile Cloud Visual Media Computing, pp. 329-353. Springer, 2015.

Ham, C. et al. Hand waving away scale. In Proceedings of the European Conference on Computer Vision (ECCV), pp. 279-293. Springer, 2014.

Hartley, R. et al. Multiple view geometry in computer vision. Cambridge university press, 2003.

Huang, Q . . . TabletGaze: Dataset and Algorithm for Unconstrained Appearance-based Gaze Estimation in Mobile Tablets. PhD thesis, Rice University, 2015.

Jianfeng, L. et al. Eye-model-based gaze estimation by rgb-d camera. In Proceedings of the IEEE Conference on Computer Vision and Pattern Recognition (CVPR) Workshops, pp. 592-596, 2014.

Kartynnik, Y. et al. Real-time facial surface geometry from monocular video on mobile gpus. arXiv:1907.06724, 2019.

Lai, W.-S. et al. Face deblurring using dual camera fusion on mobile phones. ACM Transactions on Graphics (TOG), 41(4):1-16, 2022.

Lian, D. et al. Rgbd based gaze estimation via multi-task cnn. In Proceedings of the AAAI Conference on Artificial Intelligence (AAAI), vol. 33, pp. 2488-2495, 2019.

Lowe, D. G. Distinctive image features from scale-invariant keypoints. International Journal of Computer Vision (IJCV), 60(2):91-110, 2004.

MediaPipe Solutions. Face landmark detection guide, 2023. Accessed May 1, 2023. https://developers.google.com/mediapipe/solutions/vision/face_landmarker.

Meta Platforms Inc. Instagram, 2023. Accessed May 1, 2023. https://www.instagram.com.

Muja, M. et al. Fast approximate nearest neighbors with automatic algorithm configuration. VISAPP (1), 2(331-340):2, 2009.

Mustaniemi, J. et al. Inertial-based scale estimation for structure from motion on mobile devices. In IEEE/RSJ International Conference on Intelligent Robots and Systems (IROS), pp. 4394-4401. IEEE, 2017.

Nam, Y. et al. Monitoring of heart and breathing rates using dual cameras on a smartphone. PloS one, 11(3): e0151013, 2016.

Park, K. et al. Nerfies: Deformable neural radiance fields. In Proceedings of the IEEE/CVF Conference on Computer Vision and Pattern Recognition (CVPR), pp. 5865-5874, 2021.

Piao, J.-C. et al. Adaptive monocular visual-inertial slam for real-time augmented reality applications in mobile devices. Sensors, 17(11):2567, 2017.

Remeau, F. Mc-calib: A generic and robust calibration toolbox for multi-camera systems. Computer Vision and Image Understanding, 217:103353, 2022.

Romdhani, S. et al. Estimating 3d shape and texture using pixel intensity, edges, specular highlights, texture constraints and a prior. In Proceedings of the IEEE Computer Society Conference on Computer Vision and Pattern Recognition (CVPR), vol. 2, pp. 986-993. IEEE, 2005.

Rufer, F. et al. White-to-white corneal diameter: normal values in healthy humans obtained with the orbscan ii topography system. Cornea, 24(3):259-261, 2005.

Shih, S.-W. et al. A novel approach to 3-d gaze tracking using stereo cameras. IEEE Transactions on Systems, Man, and Cybernetics, Part B (Cybernetics), 34(1):234-245, 2004.

Snap Inc. Snap AR Lens Studio, 2023. Accessed May 1, 2023. https://ar.snap.com/en-US/lens-studio.

Snap Inc. Snapchat, 2023. Accessed May 1, 2023. https://www.snapchat.com.

Speciale, P. Privacy preserving image queries for camera localization. In Proceedings of the IEEE/CVF International Conference on Computer Vision (ICCV), pp. 1486-1496, 2019.

Terzakis, G. A consistently fast and globally optimal solution to the perspective-n-point problem. In Proceedings of the European Conference on Computer Vision (ECCV), pp. 478-494. Springer, 2020.

Tsai, R. Y. et al. A new technique for fully autonomous and efficient 3d robotics hand/eye calibration. IEEE Transactions on Robotics and Automation, 5(3):345-358, 1989.

Wang, K. et al. Real time eye gaze tracking with kinect. In Proceedings of the International Conference on Pattern Recognition (ICPR), pp. 2752-2757. IEEE, 2016.

Wood, et al. Eyetab: Model-based gaze estimation on unmodified tablet computers. In Proceedings of the Symposium on Eye Tracking Research and Applications, pp. 207-210, 2014.

Yu, Z. Deep learning for face anti-spoofing: A survey. arXiv preprint arXiv:2106.14948, 2021.

Zenni Optical Inc. How to measure your pupillary distance, 2023. Accessed May 1, 2023. https://www.zennioptical.com/measuring-pd-infographic.

Zhang, Z. A flexible new technique for camera calibration. IEEE Transactions on Pattern Analysis and Machine Intelligence (TPAMI), 22(11):1330-1334, 2000.

Zhou, X. et al. Two-eye model-based gaze estimation from a kinect sensor. In Proceedings of the IEEE International Conference on Robotics and Automation (ICRA), pp. 1646-1653. IEEE, 2017.

Zhu, X. et al. Face alignment in full pose range: A 3d total solution. IEEE Transactions on Pattern Analysis and Machine Intelligence (TPAMI), 41(1):78-92, 2017.

Yu, Rui et al. "Be Real in Scale: Swing for True Scale in Dual Camera Mode," 2023 IEEE International Symposium on Mixed and Augmented Reality (ISMAR), Sydney, Australia, Oct. 16, 2023, 9 pages.

* cited by examiner

100

102

101

101b

101

101a

600

602

| Calibrate camera system |

604

| Capture images with away-facing stereo camera system and object-facing camera at first position and second position |

606

| Estimate relative pose of an away-facing camera |

608

| Obtain relative pose of object-facing camera |

610

| Determine scale of object |

612

| Develop AR overlay |

614

| Present AR overlay on display on or adjacent object |

OBJECT SCALE UTILIZING AWAY-FACING IMAGES

TECHNICAL FIELD

Examples set forth herein generally relate to determining the scale of an object in an image and, in particular, to determine the scale of an object in an image captured by an object-facing camera of a mobile device utilizing information in images captured by an away-facing stereo camera system (e.g., two cameras, or a camera and a distance sensor) of the mobile device.

BACKGROUND

Extended reality (XR), a term encapsulating augmented reality (AR), virtual reality (VR), and mixed reality (MR), is revolutionizing everyday consumer experiences and transforming diverse industry segments from industrial manufacturing and healthcare to education and retail. Many mobile XR applications (apps) that use the front-facing monocular camera of a mobile device can benefit from knowing the metric scale of objects, such as a user's face, in images captured by those cameras. However, the true scale of such objects is hard to measure because monocular vision suffers from a fundamental ambiguity in scale.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which.

DETAILED DESCRIPTION

Figure 1A:
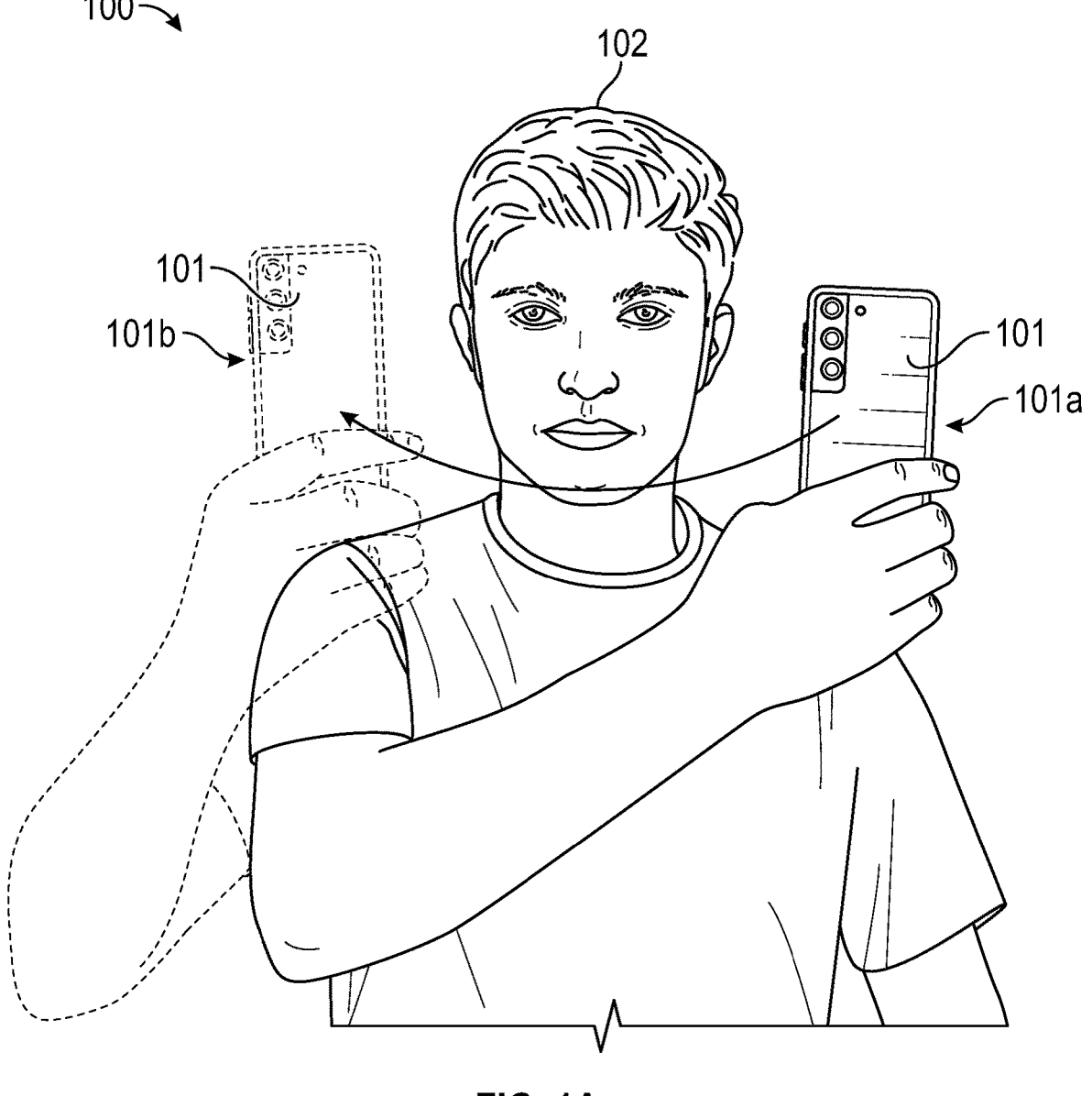
FIG. 1A is an illustration depicting use of a mobile device to determine the scale of an object (e.g., a user's head) in an image captured by the mobile device.

Various implementations and details are described with reference to examples for determining an object's scale using a mobile device (such as a cellular telephone). The mobile device includes at least one object-facing camera (e.g., a monocular camera) and an away-facing stereo camera system. Information captured using the away-facing stereo camera system is used to estimate relative pose information for determining the scale of the object in images captured by the object-facing camera. The proposed system leverages the scene images surrounding the mobile device to resolve scale ambiguity and calculate the absolute scale.

Conventional systems for determining an object's scale obtained with a monocular camera typically use prior knowledge about the scene, which either have a large error or are not easily accessible. For example, methods that rely on extra prior information are either not accurate (e.g., assuming known iris size) or are not easily accessible (e.g., requiring extra tools such as a ruler or a bank card).

In an example, the techniques described herein set forth new methods to determine the scale of an object, such as the face, in which a user moves the mobile device from a first position to a second position (e.g., in a swinging motion; either from right to left or left to right) to capture two images (e.g., "selfies" of the user) in a dual camera mode (i.e., a mode in which images are concurrently captured by both the front and rear cameras of a mobile device). The dual camera mode allows simultaneous streaming of the front camera and the rear camera(s) in a single device. A computer vision method is applied to first estimate the absolute motion of the mobile device from the information/images captured by two rear cameras (or a camera and a distance sensor), and then calculate a point cloud of the face through triangulation.

Knowing the motion of the front camera between the two selfies enables the use of triangulation to calculate the true scale of the face. Since the front and rear cameras are rigidly attached together on a mobile device, their motion will be essentially the same. The motion of the rear camera(s) is generally easier to estimate because: (1) rear cameras typically capture the surrounding world with a larger field-of-view (FOV), most of which can be assumed static and provides a reference for motion estimation and (2) many mainstream smartphones have at least two back-facing cameras (e.g., main camera, ultrawide camera, telephoto camera), which can provide the true scale of the motion. Two rear cameras (or a camera and a distance sensor) may be used to reconstruct a true-scale 3D point cloud of the back scene based on stereo computer vision. The true-scale motion of the rear cameras may be tracked by matching the 3D point cloud reconstructed before and after the swing. The estimated motion is then transferred to the front camera and used to recover the true scale of the face.

The methods described herein are preferable to conventional techniques because of their improved accuracy and ease of use. These methods are applicable to a wide range of applications (e.g., virtual try-on for online shopping, true-scale 3D face modeling, gaze tracking, and face anti-spoofing) by introducing true scale to smartphone-based XR.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the devices, associated components, and any other devices incorporating, for example, a camera, an inertial measurement unit, or both such as shown in any of the drawings, are given by way of example only, for illustration and discussion purposes. In operation, the devices may be oriented in any other direction suitable to the particular application of the device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Reference now is made in detail to the examples illustrated in the accompanying drawings.

FIG. 1A is an illustration depicting use of a mobile device 101 during a process to determine the scale of an object 102 (e.g., a head of the user) in an image captured by the mobile device 101. The mobile device 101 includes an object-facing camera (which is a single camera on a front of a mobile device in one example) to capture the image of the object 102 and an away-facing stereo camera system (which includes two or more cameras on a back of a mobile device or at least one camera and a distance sensor on a back of a mobile device in some examples).

To determine the scale of the object 102 in the image captured by the object-facing camera of the mobile device 101, the mobile device 101 is moved from a first position 101a to a second position 101b. As described in further detail below, stereo image information is obtained from the away-facing camera system in each of the first and second positions 101a, b of the mobile device 101 and an image of the object is obtained from the object-facing camera in at least one of the first and second positions 101a, b. The stereo image information is then used to estimate relative pose information for the camera, which is then transformed to the image(s) of the object from the object-facing camera for use in determining the scale of the object. Once the scale of the object is determined, the scale can be used to, for example, develop AR overlays and present the AR overlay on a display of the mobile device.

4

Figure 1B:
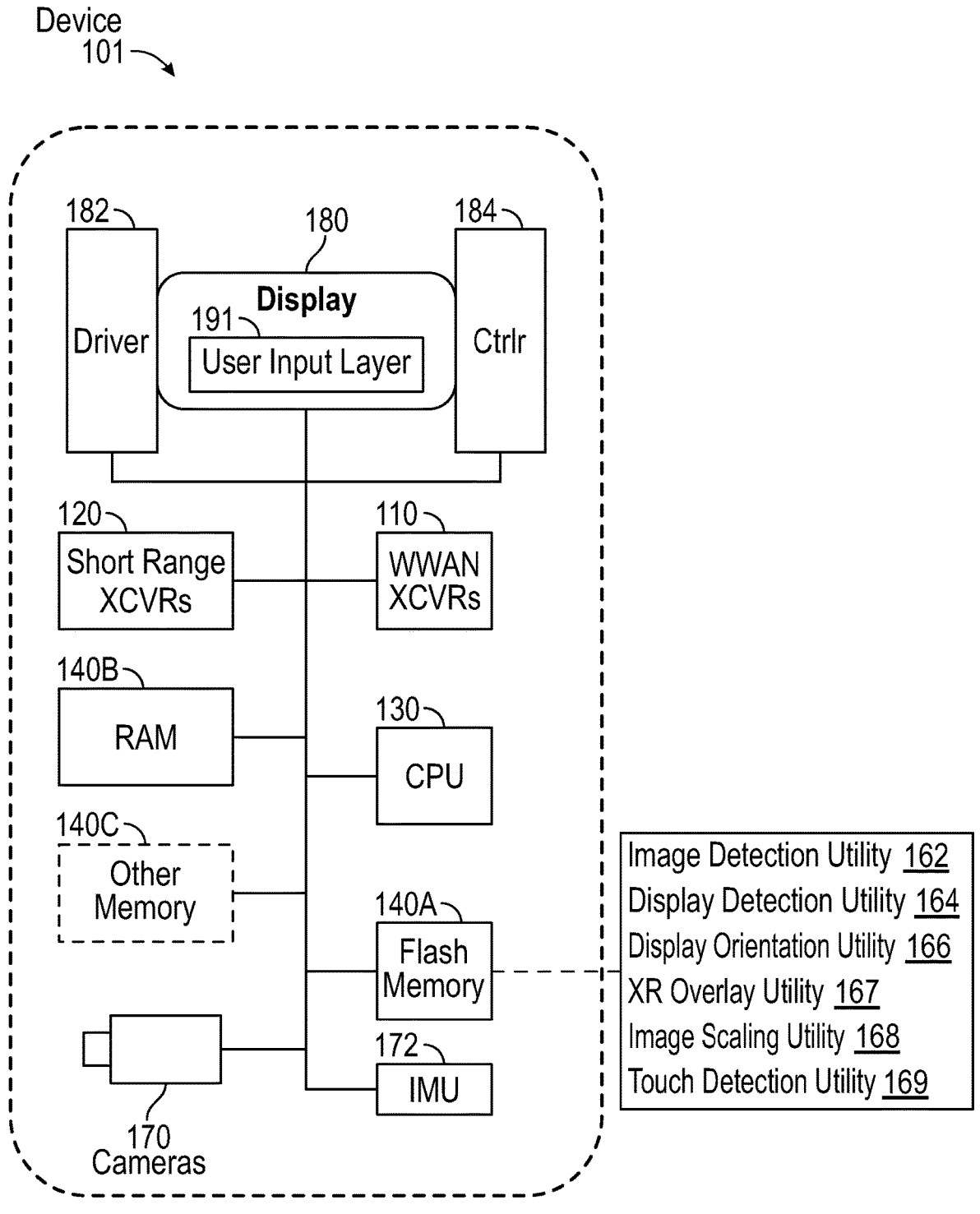
FIG. 1B is a block diagram depicting an example mobile device with a camera system for use in determining the scale of an object in the image captured by the mobile device in FIG. 1A.

FIG. 1B is a high-level functional block diagram of an example mobile device 101 for use in determining the scale of an object. Mobile device 101 includes a flash memory 140A that stores programming or code to be executed by a CPU 130 to perform all or a subset of the functions described herein. Flash memory 140A may further include multiple images or video, which are generated via the cameras 170 or received from another device via transceivers 110/120.

Figure 3:
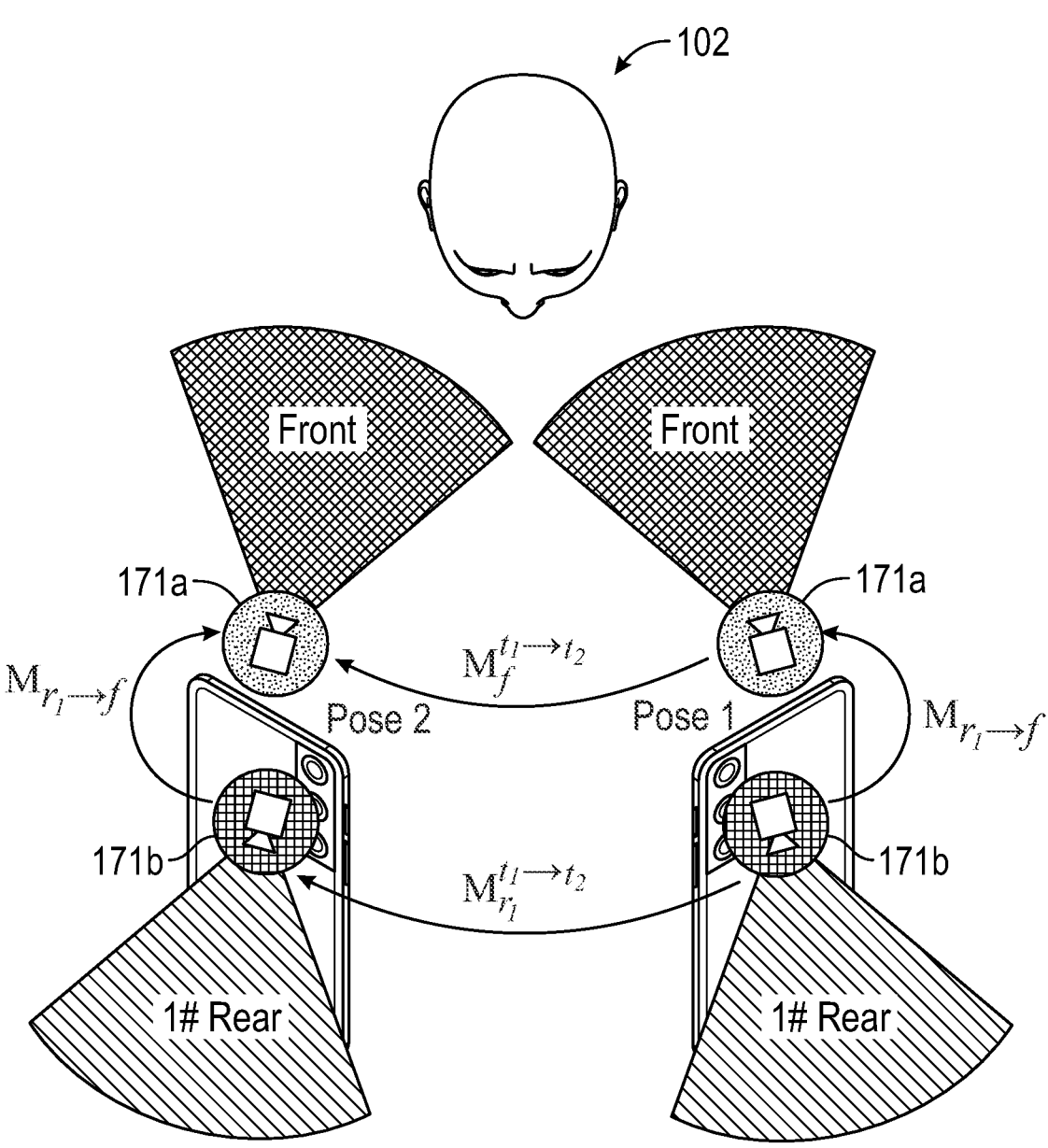
FIG. 3 is an illustration depicting transformations for use in the process of FIG. 2.

The mobile device 101 includes a cameras 170. The cameras 170 include an object-facing camera 171a (FIG. 3) and an away-facing stereo camera system 171b (FIG. 3). The away-facing stereo camera system 171b includes at least two cameras with overlapping fields of view (e.g., two or more of a main camera, an ultrawide camera, or a telephoto camera) or at least one camera and at least one distance sensor.

As shown, the mobile device 101 includes an image display 180. An image display driver 182 and controller 184, under control of CPU 130, control the display of images on the image display 180. In the example of FIG. 1B, the image display 180 includes a user input layer 191 (e.g., a touchscreen) that is layered on top of or otherwise integrated into the screen used by the image display 180. The image display driver 182 and controller 184 are coupled to the CPU 130 in order to drive the display 180.

The mobile device may be a touchscreen-type mobile device. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 1B therefore provides a block diagram illustration of the example mobile device 101 with a user interface that includes a touchscreen input layer 191 for receiving input (by touch, multi-touch, or gesture, and the like, by hand, stylus or other tool) and an image display 180 for displaying content.

As shown in FIG. 1B, the mobile device 101 includes at least one digital transceiver (XCVR) 110, shown as WWAN XCVRs, for digital wireless communications via a wide-area wireless mobile communication network. The mobile device 101 also includes additional digital or analog transceivers, such as short-range transceivers (XCVRs) 120 for short-range network communication, such as via NFC, VLC, DECT, ZigBee, Bluetooth™, or WiFi. For example, short range XCVRs 120 may take the form of any available two-way wireless local area network (WLAN) transceiver of a type that is compatible with one or more standard protocols of communication implemented in wireless local area networks, such as one of the WiFi standards under IEEE 802.11.

The mobile device 101 includes one or more motion/orientation-sensing components referred to as an orientation sensor (IMU) 172. The motion-sensing components may be micro-electro-mechanical systems (MEMS) with microscopic moving parts incorporated into a microchip. The orientation sensor 172 in some example configurations includes an accelerometer, a gyroscope, and a magnetometer. The accelerometer senses the linear acceleration of the device 101 (including the acceleration due to gravity) relative to three orthogonal axes (x, y, z). The gyroscope senses the angular velocity of the device 101 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 101 relative to magnetic north. The position of the device 101 may be determined using one or more of image information, location sensors, such as a GPS unit, one or more transceivers to generate relative position coordinates, altitude sensors or barometers, or other orientation sensors.

The orientation sensor 172 may include or cooperate with a digital motion processor or programming that gathers the raw data from the components and computes a number of useful values about the position, orientation, and motion of the device 101. For example, the acceleration data gathered from the accelerometer can be integrated to obtain the velocity relative to each axis (x, y, z); and integrated again to obtain the position of the device 101 (in linear coordinates, x, y, and z). The angular velocity data from the gyroscope can be integrated to obtain the position of the device 101 (in spherical coordinates). The programming for computing these useful values may be stored in memory 140 and executed by the CPU 130.

To generate location coordinates for positioning of the mobile device 101, the mobile device 101 can include a global positioning system (GPS) receiver. Alternatively, or additionally, the mobile device 101 can utilize either or both the short range XCVRs 120 and WWAN XCVRs 110 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 110, 120. Alternatively, or additionally, the mobile device 101 may use images captured by the cameras 170 and computer vision algorithms (such as simultaneous location and mapping (SLAM) algorithms) to extract three-dimensional data about the physical world from the data captured in digital images or video.

The transceivers 110, 120 (i.e., the network communication interface) conforms to one or more of the various digital wireless communication standards utilized by modern mobile networks. Examples of WWAN transceivers 110 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 110, 120 provide two-way wireless communication of information including digitized audio signals, still image and video signals, web page information for display as well as web-related inputs, and various types of mobile message communications to/from the mobile device 101.

The mobile device 101 further includes a microprocessor that functions as a central processing unit (CPU); shown as CPU 130 in FIG. 1B. A processor is a circuit having elements structured and arranged to perform one or more processing functions, typically various data processing functions. Although discrete logic components could be used, the examples utilize components forming a programmable CPU. A microprocessor, for example, includes one or more integrated circuit (IC) chips incorporating the electronic elements to perform the functions of the CPU. The CPU 130, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 130 or processor hardware in smartphone, laptop computer, and tablet.

The CPU 130 serves as a programmable host controller for the mobile device 101 by configuring the mobile device 101 to perform various operations, for example, in accordance with instructions or programming executable by CPU 130. Example operations include various general operations of the mobile device, as well as operations related to the programming for applications on the mobile device 101.

The mobile device 101 includes a memory or storage system for storing programming and data. The illustrated memory system includes a flash memory 140A, a random-access memory (RAM) 140B, and other memory components 140C. The RAM 140B serves as short-term storage for instructions and data being handled by the CPU 130, e.g., as a working data processing memory. The flash memory 140A typically provides longer-term storage.

In the example of mobile device 101, the flash memory 140A is used to store programming or instructions for execution by the CPU 130. Depending on the type of device, the mobile device 101 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The memory 140A includes, inter alia, an image detection utility 162, a display detection utility 164, a display orientation utility 166, an XR overlay utility 167, an image scaling utility 168, and a touch detection utility 169. The image detection utility 162 identifies and detects parameters of an image for display. The display detection utility 164 identifies and detects parameters of display on which the image will be displayed. The display orientation utility 166 detects orientation/rotation of the display (e.g., based on input from orientation sensor 172 or images processed using a computer vision application). The XR overlay utility 167 generates images for presentation on the display 180 that include one or more scaled items for presentation on or near an object (e.g., an item such as a pair of sunglasses scaled to match the scale of a head in video captured by a camera and presented on the display 180). The overlay images generated by the XR overlay utility 167 may be configured for concurrent display on a display of the mobile device with a real-time image of the object. The image scaling utility 168 determines the scale of the object in the image(s) obtained by the object-facing camera 171a responsive to stereo data captured by the away-facing camera system 171b.

Figure 2:
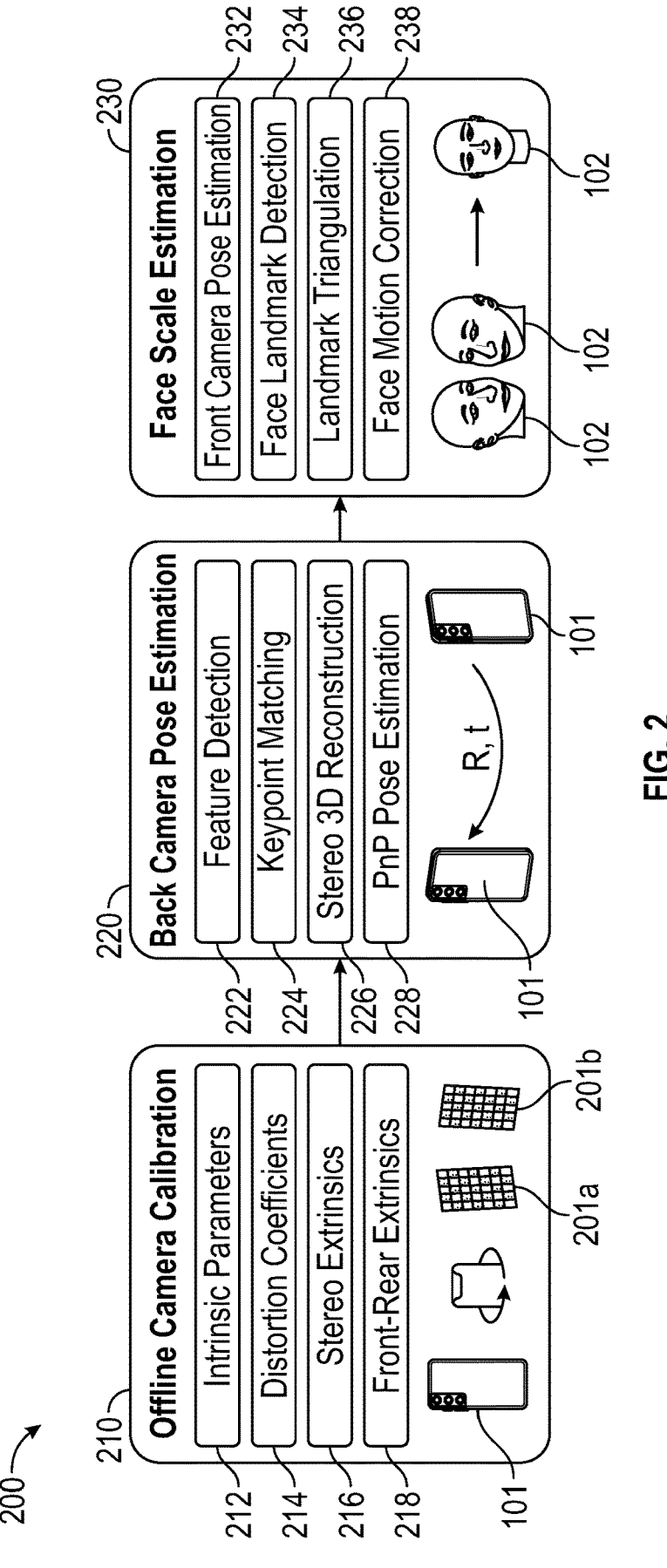
FIG. 2 is an illustration depicting an overview of a process for use in determining the scale of the object in an image captured by the mobile device.

FIG. 2 provides an overview of a process 200 implemented using a system for determining the scale of the object in an image captured by an object-facing camera 171a of the mobile device 101 having both the object-facing camera 171a and an away-facing stereo camera system 171b. The process includes offline camera calibration 210 (e.g., object-facing camera and away-facing system), away-facing stereo camera system pose estimation 220, and object scale estimation 230 (e.g., scale of a face).

During offline camera calibration 210, the system estimates the intrinsic parameters of each camera at block 212, the distortion coefficients of each camera at block 214, the stereo extrinsics (i.e., rotation and translation) of the away-facing stereo camera system (e.g., two rear cameras) at block 216, and the front-rear extrinsics between the object-facing camera (e.g., front camera) and the rear-facing camera system (e.g., two cameras) at block 218.

The following description represents each camera of the mobile device 101 with a pinhole camera model with lens distortions, with K representing the intrinsic parameters. The extrinsic parameters include a 3×3 orthogonal rotation matrix $R \in SO(3)$ and translation $t \in R^3$. In practice, the lenses of the cameras introduce image distortions, which include radial distortion and tangential distortion in a Brown-Conrady's model with five distortion parameters $k=(k_1, k_2, k_3, p_1, p_2)$. In one example, there are three cameras: a front camera, $C_f$, and two rear cameras $C_{r1}$, $C_{r2}$. For convenience, $C_{r1}$ is set as the main camera. The parameters are calibrated, including the intrinsic parameters $(K_f, K_{r1}, K_{r2})$ and distortion coefficients $(k_f, k_{r1}, k_{r2})$ of each camera, the transformation $M_{r1 \to r2}$ between $C_{r1}$ and $C_{r2}$ (stereo extrinsics), and the transformation $M_{r1 \to f}$ between $C_{r1}$ and $C_f$ (front-rear extrinsics). The system employs a 4×4 homogenous transformation matrix representation, $$M_* = \begin{bmatrix} R_* & t_* \\ 0 & 1 \end{bmatrix},$$

where * denotes any superscripts, subscripts, or combinations thereof. Although a system with two rear cameras is described, implementation using a system with one rear camera and a depth sensor will be understood by one of skill in the art from the description herein.

For single camera calibration, the system uses a conventional single-camera calibration method to obtain the intrinsic parameters and distortion coefficients of each camera. In one example, the system obtains a few images of a predefined pattern (e.g., 9×6 chessboard 201a, 201b with a grid size of 35 mm) and detect specific points on the pattern (e.g., square corners on the chessboard). Given real-world coordinates (e.g., in meter units) and the corresponding image coordinates (e.g., in pixel units) of these points, the system estimates the intrinsic camera parameters, distortion coefficients, and extrinsic parameters of each image by minimizing the reprojection error of the points using, for example, a Levenberg-Marquardt optimization algorithm.

For cross-camera calibration, the intrinsic parameters and distortion coefficients of the cameras are fixed and $M_{r1 \to r2}$ and $M_{r1 \to f}$ are estimated using a conventional multi-camera calibration toolbox. For example, two predefined patterns (e.g., chessboards 201a, 201b) may be positioned in front of and behind the mobile device and a few sets of synchronized images are then taken using the three cameras. Assuming a large overlapping field of view (FOV) between the two rear cameras, the stereo calibration of $M_{r1 \to r2}$ is a straightforward extension of single-camera calibration. The calibration of the transformation $M_{r1 \to f}$ between the front $C_f$ and rear $C_{r1}$ cameras with non-overlapping FOV may be based on a conventional linear hand-eye calibration strategy. The estimated $M_{r1 \to r2}$ and $M_{r1 \to f}$ are then jointly refined via bundle adjustment. Once the calibration is complete, all parameters are fixed for reuse at later stages.

During back camera pose estimation 220, the system detects features within images captured at separate positions at two points in time at block 222, matches feature keypoints from the images at block 224, reconstructs a stereo 3D model at block 226, and estimates poses at each of the positions at block 228.

For a first position (Pose 1), the system reconstructs a realscale 3D point cloud of a back scene from the captured stereo rear images. Then, for a second position (Pose 2), the system matches keypoints between the images of Pose 1 and Pose 2 to establish a correspondence between the keypoints of Pose 2 and a 3D point cloud. Based on this 2D-3D correspondence, the system estimates the relative pose between Pose 2 and Pose 1 by solving a Perspective-n-Point (PnP) problem.

The system then estimates the true-scale relative pose $$M_{r1}^{t1 \to t2}$$

of $C_{r1}$ swinging from Pose 1 ($t_1$) to Pose 2 ($t_2$) using the images $$\{I_{r1}^{t1}, I_{r2}^{t1}, I_{r1}^{t2}, I_{r2}^{t2}\}$$

captured by the dual rear cameras $\{C_{r1}, C_{r2}\}$ at Pose 1 and Pose 2, as well as the calibration parameters.

For feature detection and keypoint matching (at blocks 222 and 224), the system initially uses the stereo images at Pose 1

$$\{I_{r1}^{t1}, I_{r2}^{t1}\}$$

to reconstruct a true-scale 3D point cloud of the back scene by employing a scale-invariant feature transform (SIFT) algorithm to detect keypoints on the two images separately in order to find pairs of matched keypoints between the two images. Each keypoint corresponds to, for example, a 128-dimensional descriptor. For each keypoint, the system uses a Fast Library for Approximate Nearest Neighbors (FLANN) algorithm to find nearest neighbor keypoints on the other image having smallest Euclidean distances of the corresponding descriptors. For initial matches, the system applies a Lowe's ratio test (i.e., the ratio of the distance of the nearest neighbor to the point, to the distance of the next nearest neighbor to the point) to preserve good matches where the distance ratio between the two nearest matches of a keypoint is below a threshold (e.g., 0.7). The system then identifies pairs of matched keypoints $$\{\tilde{p}_i^{t1,r1} \leftrightarrow \tilde{p}_i^{t1,r2} \mid i = 1, 2, \ldots, n\}$$

on the stereo images.

For stereo 3D reconstruction (at block 226), taking $$I_{r1}^{t1}$$

as an example, the matched keypoints $$\{p^{t1,r1} \mid i = 1, 2, \ldots, n\}$$

are 2D points in pixel units on the image. To reconstruct 3D points in physical world, the system initially converts each keypoint $$\{p_i^{t1,r1}\}$$

to the normalized coordinate $$\{\tilde{p}_i^{t1,r1}\}$$

in meter units by performing undistortion and reverse perspective transformation using intrinsic parameters $K_{r1}$ and distortion coefficients $k_{r1}$. Similarly, the keypoints on the other image $$I_{r2}^{f1}$$

can also be converted to normalized coordinates, resulting in n pairs of matched points in realworld coordinates $$\{\tilde{p}_i^{t1,r1} \leftrightarrow \tilde{p}_i^{t1,r2} | i = 1, 2, \dots, n\}.$$

The system then triangulates the 3D point $P_i$ for each correspondence $$\{\tilde{p}_i^{t1,r1} \leftrightarrow \tilde{p}_i^{t1,r2}\}$$

using calibrated $M_{r1 \rightarrow r2}$, e.g., using a direct linear transformation (DLT) resulting in a point cloud $\{P_i | i=1, 2, \dots, n\}$.

The system may further identify outliers by reprojecting the 3D points to the image planes. If the reprojection error is greater than a threshold (e.g., 8 pixels), the system treats it as an outlier. After removing outliers, the system then uses the remaining n' 3D points of the point cloud $\{P_i | i=1, 2, \dots, n'\}$ reconstructed in Pose 1.

For camera pose estimation (at block 228), in Pose 2, the dual rear cameras also capture a pair of images $$\{I_{r1}^{t2}, I_{r2}^{t2}\}.$$

As for Pose 1, the system extracts the SIFT features on $$I_{r1}^{t2}$$

and matches them with the keypoints on $$I_{r1}^{t1}.$$

In one example, the system retains only the matches where the keypoints on $$I_{r1}^{t1}$$

are also used to reconstruct the point cloud $\{P_i | i=1, 2, \dots n'\}$, resulting in n" pairs (n"≤n') of 2D keypoints matches $$\{p_i^{t1,r1} \leftrightarrow p_i^{t2,r1} \mid i = 1, 2, \dots, n''\}.$$

They are then converted to normalized coordinates $$\{\tilde{p}_i^{t1,r1} \leftrightarrow \tilde{p}_i^{t2,r2} \mid i = 1, 2, \dots, n''\}$$

using $K_{r1}$ and $k_{r1}$. Since $$\tilde{p}_i^{t1,r1}$$

also correspond to a 3D point $P_i$ in the point cloud, the system can establish the 2D-3D correspondence $$\{\tilde{p}_i^{t2,r2} \leftrightarrow P_i \mid i = 1, 2, \dots, n''\}.$$

Estimating $$M_{r1}^{t1 \rightarrow t2}$$

according to this 2D-3D correspondence is a Perspective-n-Point (PnP) problem, which can be formulated as finding the optimal rotation matrix R and translation vector $\bar{t}$ to minimize the summed squared projection errors of the n" points as shown in Equation 1:

$$\min_{R,t} \sum_{i=1}^{n''} \left\| \tilde{p}_i^{t2,r1} - \frac{RP_i + t}{1_Z^T(RP_i + t)} \right\|^2, \tag{1}$$

where $1_z = [0, 0, 1]^T$. The system may solve this minimization problem iteratively using a Levenberg-Marquardt optimization.

According to Equation 1, the optimization is based on all n" points. If the keypoints are highly unbalanced on the image (e.g., many more points in a small region than others), the pose estimation may be biased to feature-dense regions and tend to introduce a relatively large estimation error. The system may address this issue through feature binning, which divides the image into many grids and limits a maximum number of keypoints in each grid before optimization. The final estimated camera pose may be represented as $$M_{r1}^{t1 \rightarrow t2} = \begin{bmatrix} \tilde{R} & \tilde{t} \\ 0 & 1 \end{bmatrix}.$$

During face scale estimation (at block 230), the system estimates the front camera pose at block 232, detects object (e.g., facial) landmarks at block 234, triangulates landmarks at block 236, and corrects for object motion during image capture at block 238. In other words, this component first transfers the transformation of back cameras to that of the front camera with calibrated front-rear extrinsics. The system then detects landmarks (e.g., predefined facial features) from the two images (selfies) captured by the object facing camera to reconstruct true-scale 3D face landmarks based on the true-scale camera transformation.

For front camera pose estimation (at block 232), based on the estimated relative pose $$M_{r1}^{t1 \to t2}$$

of a rear camera (e.g., rear camera Cr1) from Pose 1 to Pose 2 and the calibrated $M_{r1 \to f}$, the system can obtain the relative pose $$M_{f}^{t1 \to t2}$$

of front camera $C_f$ from Pose 1 to Pose 2. FIG. 3 depicts the relationships of the camera transformations in which $$M_{f}^{t1 \to t2} M_{r1 \to f} = M_{r1 \to f} M_{r1}^{t1 \to t2}.$$

Since $M_{r1 \to f}$ is an invertible matrix, the relative pose $$M_{f}^{t1 \to t2}$$

can be determines using Equation 2:

$$M_{f}^{t1 \to t2} = M_{r1 \to f} M_{r1}^{t1 \to t2} (M_{r1 \to f})^{-1} \qquad (2)$$

For face landmark detection (at block 234), assuming that the two images (selfies)

$$\{I_f^{t1}, I_f^{t2}\}$$

captured by the object facing camera f contain two different views of the same face, the system can first detect the 2D face landmarks (in pixel units) on the two images, e.g., using MediaPipe Face Mesh solution, available from Google LLC of Mountain View, CA, to detect m=468 face landmarks on each image. This solution employs a lightweight model that can run in real-time on mobile devices. The system matches each landmark of an image with a corresponding landmark on the other image, resulting in m pairs of landmarks $$\{p_i^{t1,f} \leftrightarrow p_i^{t2,f} \mid i = 1, 2, \dots, m\}.$$

For face landmark reconstruction (at block 236), similar to stereo 3D reconstruction (at block 236), the system initially converts the 2D landmarks to normalized coordinates using $K_f$ and $k_f$ and obtain m pairs of landmarks in realworld coordinates $$\{\tilde{p}_i^{t1,f} \leftrightarrow \tilde{p}_i^{t2,f} \mid i = 1, 2, \dots, m\}.$$

The system then uses a DLT algorithm to triangulate the 3D face landmarks $$\{\tilde{p}_i^{f} \mid i = 1, 2, \dots, m\}$$

from 2D landmark pairs using camera transformation $$M_{f}^{t1 \to t2}.$$

Based on the 3D landmark reconstruction, the system is able to obtain not only the true-scale 3D face mesh but also the distance and angle from the camera to the face. This feature can be employed by various applications, such as, by way of non-limiting example, true-scale virtual try-on, tru-scale 3D face modeling, eye gaze tracking, and facial anti-spoofing.

For face motion correction (at block 238), in 3D face triangulation, there is an underlying assumption that the face remains still when the person swings the phone. If the face moves, the reconstructed 3D face mesh may be the wrong size, deformed, or a combination thereof. The impact of face motion on face scale estimation is now addressed using defined evaluation metrics. In online shopping for glasses (spectacles), pupillary distance (i.e., the distance between left and right pupils; PD) is crucial for making glasses with prescription lenses. Since PD also reflects the accuracy of face scale estimation, the same evaluation metric may be used.

Figures 4A, 4B, 4C:
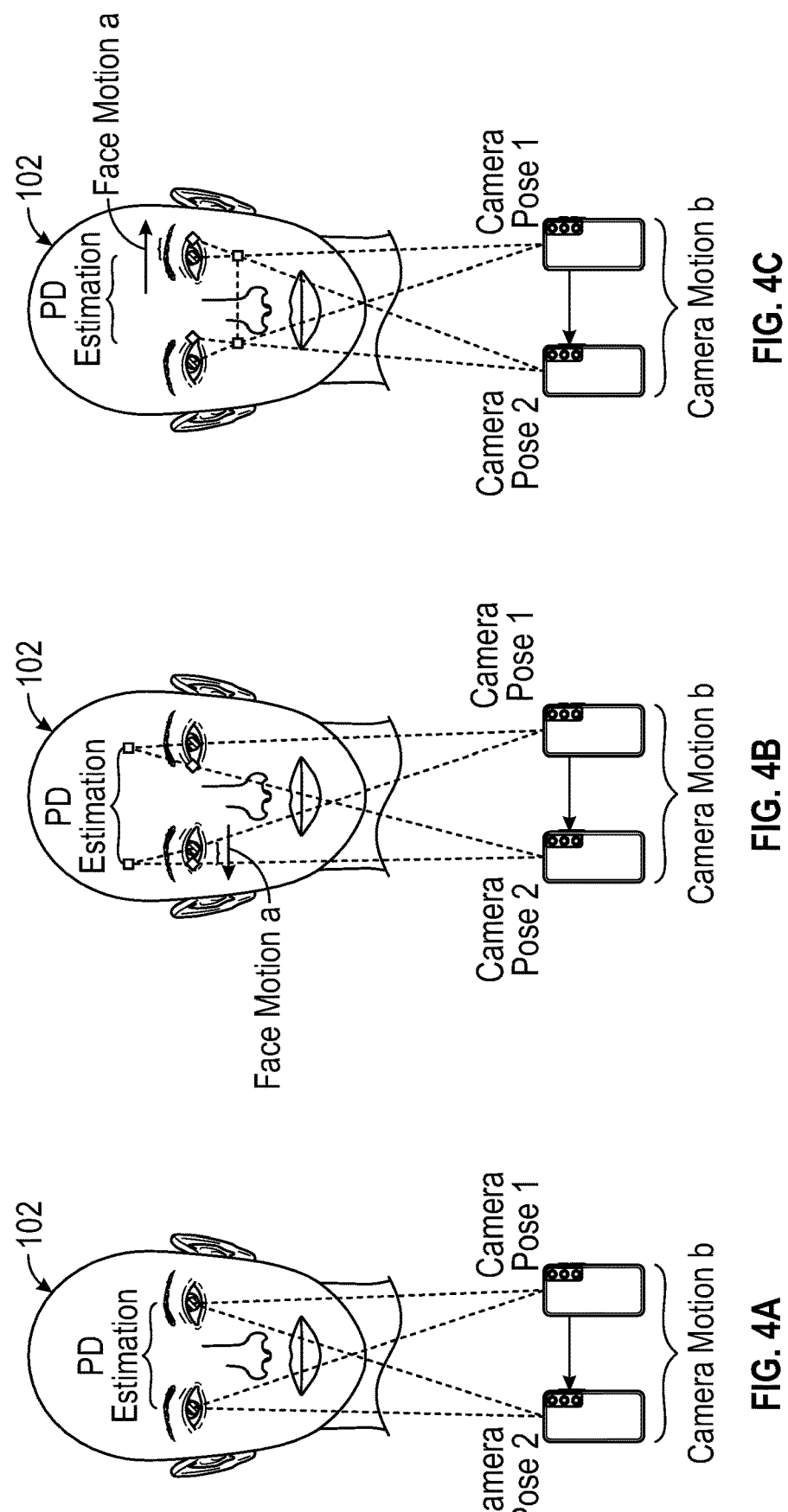
FIGS. 4A, FIG. 4B, and FIG. 4C are illustrations depicting impact analysis of an object (e.g., a user's head) with no face motion when the mobile device is moved, face motion in the direction of mobile device movement, and face motion in the opposite direction of mobile device movement, respectively.

To simplify the analysis, we assume that the mobile device 101 and the face only move along the X-axis direction. FIGS. 4A, FIG. 4B, and FIG. 4C are illustrations depicting impact analysis of an object (face) with no face motion when mobile device 101 is moved (FIG. 4A), face motion in the direction of mobile device movement (FIG. 4B), and face motion in the opposite direction of mobile device movement (FIG. 4C), respectively.

As shown in FIGS. 4A, 4B, and 4C, the pupils are centered within the respective eye of the face in Pose 1. After the mobile device 101 is moved for a distance b to Pose 2, the positions of the pupils are marked with a diamond. If there is no face motion (FIG. 4A), the pupils estimated from triangulation are true positions without errors. If the face moves in the same direction as the mobile device 101 for a distance of a (FIG. 4B), the pupils estimated from triangulation are marked with a square. By using properties of similar triangles, the system can derive the PD estimation is $$\frac{a}{b-a} \times 100\%$$

larger than the true value. Similarly, if the face moves in the opposite direction to the phone for a distance of a (FIG. 4C), the PD estimation is $$\frac{a}{b+a} \times 100\%$$

smaller than the true value. For example, if a person's PD is 65 mm, the mobile device 101 moves for 100 mm, and the face moves 10 mm in the same direction, the error in PD estimation is $$\frac{10}{100-10}65 \approx +7.22 \text{ mm.}$$

Conversely, if the face moves 10 mm in the opposite direction, the error in PD estimation is $$-\frac{10}{100+10}65 \approx -5.91 \text{ mm.}$$

Thus, it can be seen that face motion has a non-negligible impact on PD estimation.

Figure 5:
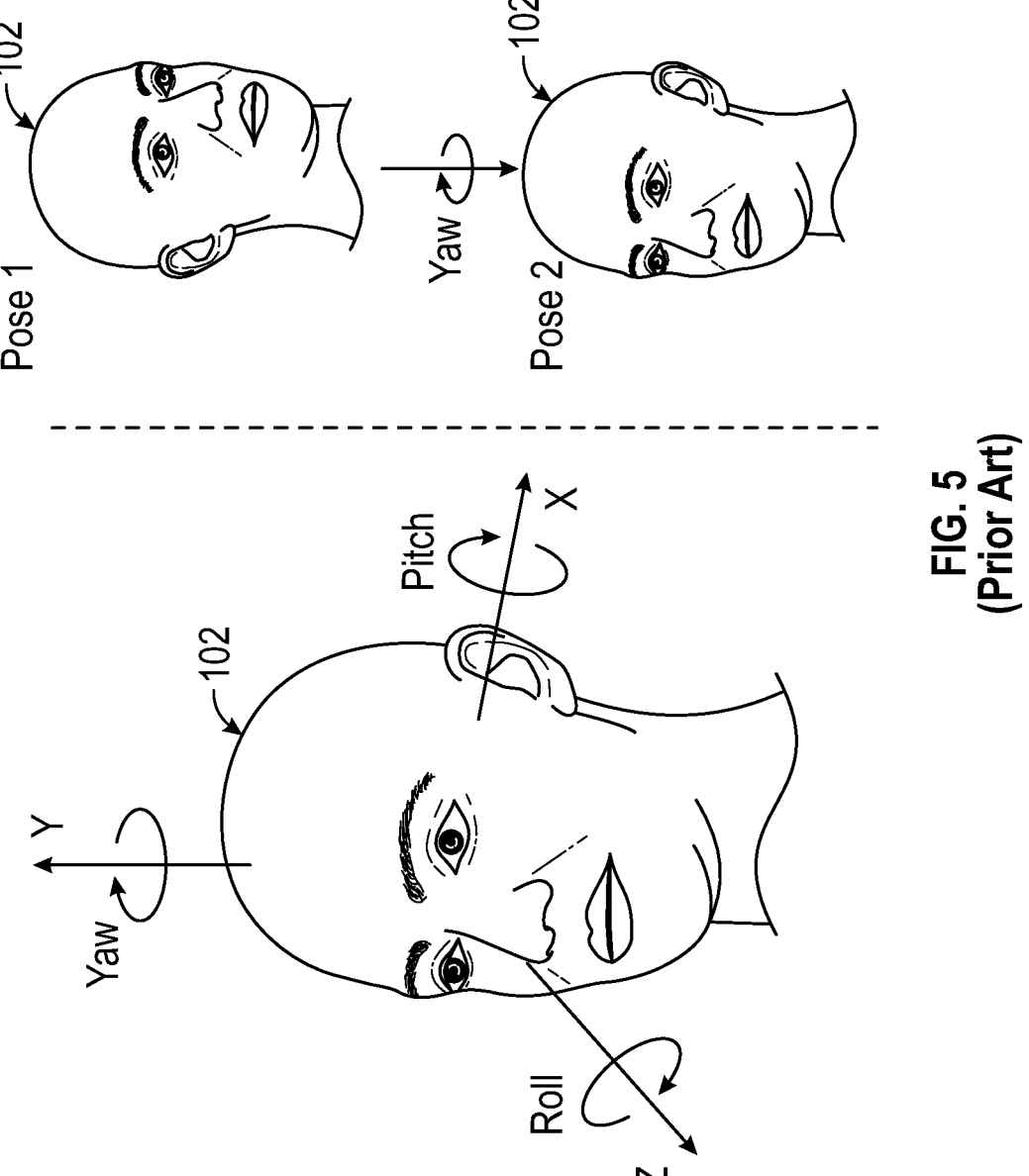
FIG. 5 is an illustration depicting facial rotation directions that may occur during capture of images.

The user's head can undergo arbitrary 3D translation or rotation during the swing. There are three directions of human head rotation: pitch, roll, and yaw, as shown in FIG. 5, with most of the head motion observed being negligible, with the exception of the yaw. Therefore, in one example, the system implements a correction algorithm that models the head motion as a one degree-of-freedom yaw motion.

The yaw correction method is based on the observation that if the head rotates in the yaw direction during hand swing, the 3D face mesh reconstructed from the 2D landmarks of the two images $$\{I_f^{t1}, I_f^{t2}\}$$

can be deformed. For example, the 3D face may become flat or sharp in the Z direction, which is different from a normal face geometry. In one example, the system rotates the landmarks $$\{p_i^{t2,f} \mid i = 1, 2, \dots, m\}$$

on $$I_f^{t2}$$

by an angle so that the 3D face mesh reconstructed with $$\{p_i^{t1,f} \mid i = 1, 2, \dots, m\}$$

is geometrically as close to the normal face as possible. In terms of implementation, the system first defines a 3D canonical face, and then estimates the 3D face landmarks $$\{P_i^{t2,f} \mid i = 1, 2, \dots, m\}$$

from a single image $$I_f^{t2}$$

and the transformation $$M_{3D\rightarrow2D}^{t2,f}$$

from 3D to 2D landmarks. The 3D face landmarks are approximated from the 3D canonical face and do not reflect the real size of the face. Then, the system rotates the 3D face landmarks by an angle $\alpha$ in the yaw direction and projects them to $$I_f^{t2}$$

and the transformation $$M_{3D\rightarrow2D}^{t2,f}.$$

The new 2D landmarks $$\{p_i^{t2,f} \mid i = 1, 2, \dots, m\}$$

on $$I_f^{t1}$$

may then be used to triangulate new 3D face landmarks $$\{P_i^f(\alpha) \mid i = 1, 2, \dots, m\}$$

with the landmarks $$\{p_i^{t1,f} \mid i = 1, 2, \dots, m\} \text{ on } I_f^{t1}.$$

The system then obtains different triangulated 3D face candidates by changing the value of $\alpha$.

Among these 3D face candidates, the system selects the one that is closest to the real face geometry as the final result. For example, scaled point cloud registration may be performed between the triangulated 3D face candidate $$\{P_i^f(\alpha) \mid i = 1, 2, \dots, m\}$$

and the 3D face landmarks $$\{P_i^{t2,f} \mid i = 1, 2, \dots, m\}.$$

The angle $\alpha*$ that produces the smallest registration error (i.e., root-mean-squared pairwise distance) is the estimated head rotation. The corresponding 3D face candidate $$\{P_i^f(\alpha*) \mid i = 1, 2, \ldots, m\}$$

are the corrected landmarks.

Figure 6:
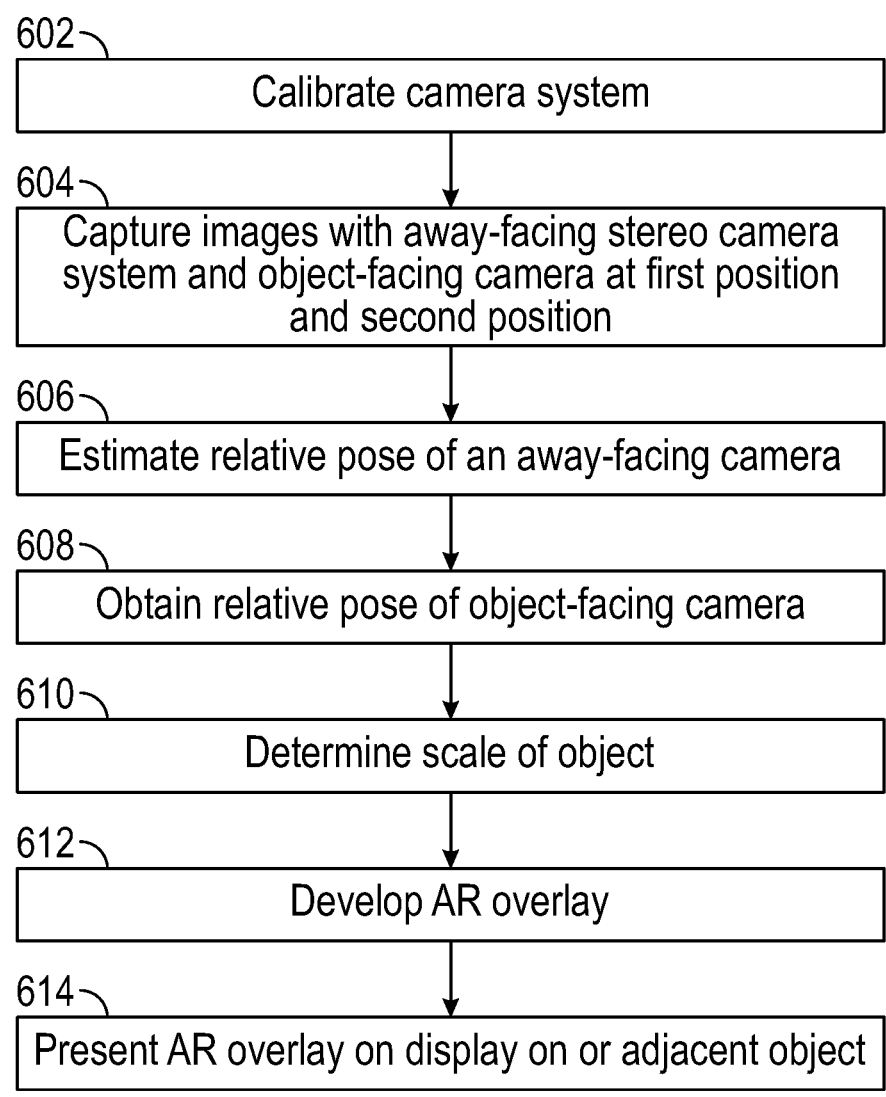
FIG. 6 is a flowchart of steps in an example process for determining the scale of an object in an image captured by a mobile device.

FIG. 6 is a flowchart 600 of example steps for determining a scale of an object with a mobile device. For ease of explanation, the steps of flowchart 600 are described with reference to the mobile device 101 described herein. One of skill in the art will recognize other configurations not tied to mobile device 101 for use in determining the scale of an object. Additionally, it is to be understood that one or more of the steps may be omitted, performed by another component, or performed in a different order.

At block 602, the mobile device 101 calibrates the camera system of the mobile device. In one example, the camera system is calibrated on a mobile device by mobile device basis with the calibration results stored in memory of the mobile device. In another example, the camera system of a mobile device is calibrated and calibration results for that mobile device are provided to other mobile devices having the same or very similar set ups. The calibration results may be provided separately to the mobile devices for storage in respective memories or may be integrated into an application that determines the scale of objects.

At block 604, the mobile device 101 captures images with an away-facing stereo camera system and an object-facing camera with the mobile device in a first position and in a second position. In an example, the object-facing camera is a single camera positioned on a front surface of a mobile device (e.g., the surface having the primary display of the mobile device) and the away-facing stereo camera system is two or more cameras (or a camera and a distance sensor) positioned on a rear surface of a mobile device (e.g., the surface opposite the front surface). The images from the away-facing stereo camera system and the object-facing camera are captured concurrently in the first position and are captured concurrently in the second position.

In an example, image capture at the first position or the second position initiates when the user actuates a button (physical or a graphical user interface presented on a display). In another example, image capture at the first position or the second position initiates in response to feedback from a motion sensor (IMU 172) indicating that motion has begun (first position) and motion has ended (second position).

At block 606, the mobile device 101 estimates the relative pose of the away-facing stereo camera system. In one example, the mobile device 101 estimates the relative pose of the away-facing stereo camera system using a pair of images captured by respective cameras of the away-facing stereo camera system at each of the first position and the second position and calibration parameters for the away-facing stereo camera system. In another example, the mobile device 101 estimates the relative pose of the away-facing stereo camera system using an image captured by a camera and distance information captured by a distance sensor (not shown) of the mobile device 101 at each of the first position and the second position and calibration parameters for the away-facing stereo camera system.

At block 608, the mobile device 101 obtains a relative pose for the object-facing camera. In an example, the mobile device 101 obtains the relative pose for the object-facing camera using the images captured by the object-facing camera in the first and second positions of the mobile device 101 and calibration parameters for the cameras of the mobile device 101.

At block 610, the mobile device 101 determines the scale of the object (e.g., face) in the image captured at at least one of the first position or the second position. In an example, the mobile device 101 determines the scale of the object using the relative pose for the object-facing camera and the images captured by the object-facing camera.

At block 612, the mobile device 101 develops an AR overlay. In an example, the mobile device 101 develops an overlay using an overlay generation utility (e.g., XR generation utility 167) including a scaled item that is scaled based on the determined scale of the object, e.g., in order to provide a true representation of the item with respect to the object. For example, an item such as a pair of sunglasses may be scaled to depict how the item would look on an object such as a head/face.

At block 614, the mobile device 101 presents the AR overlay on the display (on or adjacent the object). In an example, the mobile device 101 presents the AR overlay on the display 180 of the mobile device using the driver 182.

Aspects of the systems and techniques described herein may be used to enhance virtual try-on applications. When shopping for glasses online (such as for sunglasses or glasses with prescription lenses), users can choose the color and style of glasses with AR-based virtual try-on apps. While traditional virtual try-on apps utilize a single selfie camera, examples described herein may be used to enhance virtual try-on using the dual camera mode available on existing mobile devices.

Since traditional virtual try-on typically uses a single selfie camera, it does not know the true size of the face. When displaying AR effects, existing virtual try-on apps usually scale the glasses to fit the detected face. In contrast, the techniques described herein can estimate the true scale of the face through the use of multiple camera of a mobile device. This can help people choose sunglasses of the right size to purchase, which greatly improves online shopping experience.

Another advantage of using multiple cameras is that they can simultaneously capture a front "selfie" image and back scene images. Thanks to this feature, during the online virtual try-on, the back scene can be rendered on virtual sunglasses to simulate the real reflection effect, which makes the AR effects more realistic and engaging.

Using multiple cameras, it is also possible to combine virtual try-on with the creative effects in Dual Camera mode. For example, a "cutout" effect in Snapchat, available from Snap Inc. of Santa Monica, California, can be enhanced into virtual try-on to replace the background of the selfie with the content of the back camera(s), resulting in a special virtual try-on experience.

Figure 7:
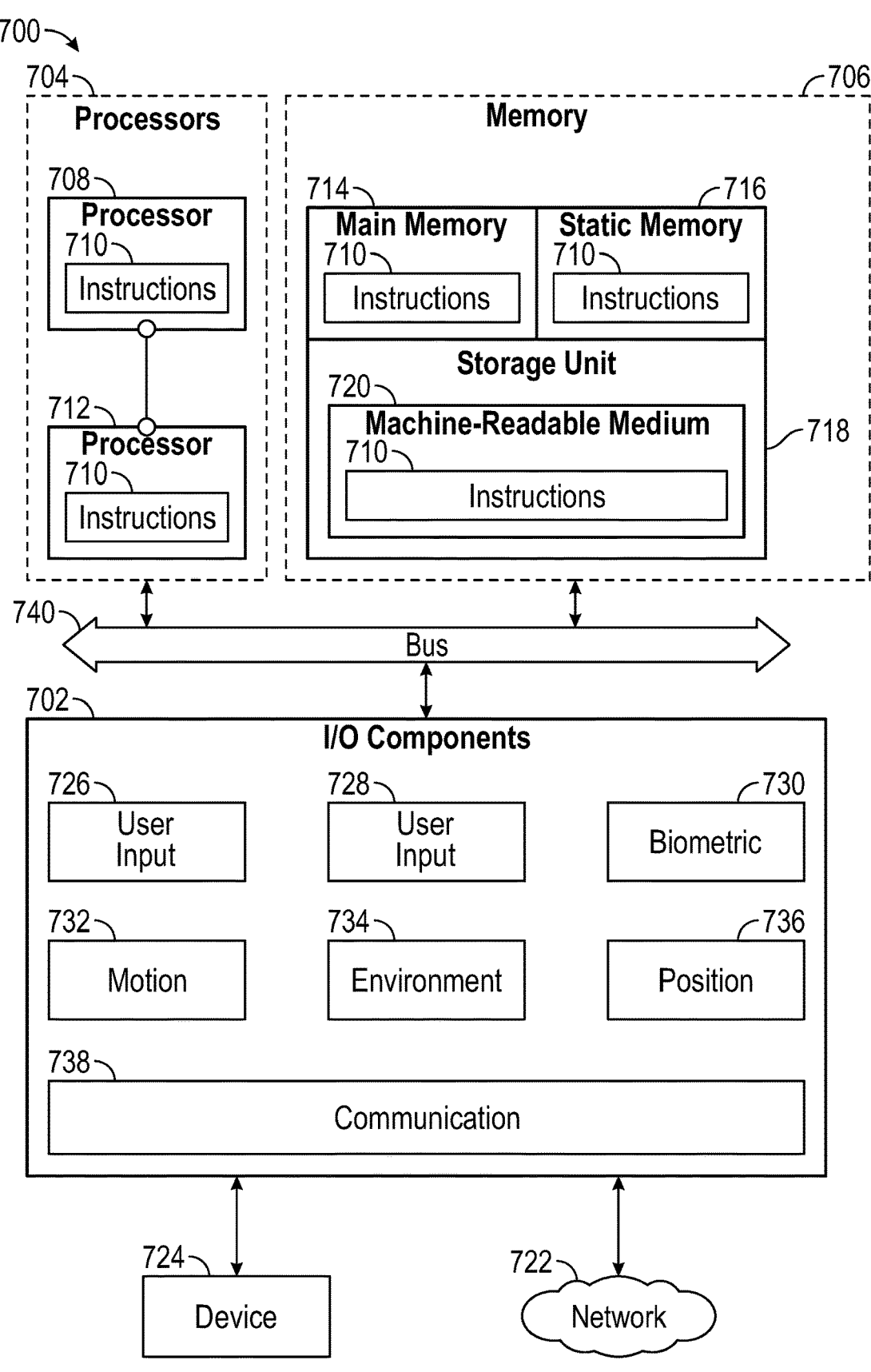
FIG. 7 is a diagram of a machine adapted to perform one or more of the methodologies described herein.

FIG. 7 is a diagrammatic representation of the machine 700 within which instructions 710 (e.g., software, a program, an application, an applet, an app, or other executable code) for causing the machine 700 to perform one or more of the methodologies discussed herein may be executed. For example, the instructions 710 may cause the machine 700 (which may be integrated into the mobile device 101) to execute one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine

700 may operate in the capacity of a server machine or a client machine in a server-client network environment, or as a peer machine in a peer-to-peer (or distributed) network environment. The machine 700 may include, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform one or more of the methodologies discussed herein. In some examples, the machine 700 may also include both client and server systems, with certain operations of a particular method or algorithm being performed on the server-side and with certain operations of the particular method or algorithm being performed on the client-side.

The machine 700 may include processors 704, memory 706, and input/output I/O components 702, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may include two or more independent processors (sometimes referred to as "cores") that may execute instructions contemporaneously. Although FIG. 7 shows multiple processors 704, the machine 700 may include a single processor with a single core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 for one or more of the methodologies or functions described herein. The instructions 710 may also reside, completely or partially, within the main memory 714, within the static memory 716, within machine-readable medium 720 within the storage unit 718, within at least one of the processors 704 (e.g., within the Processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities.

The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Figure 8:
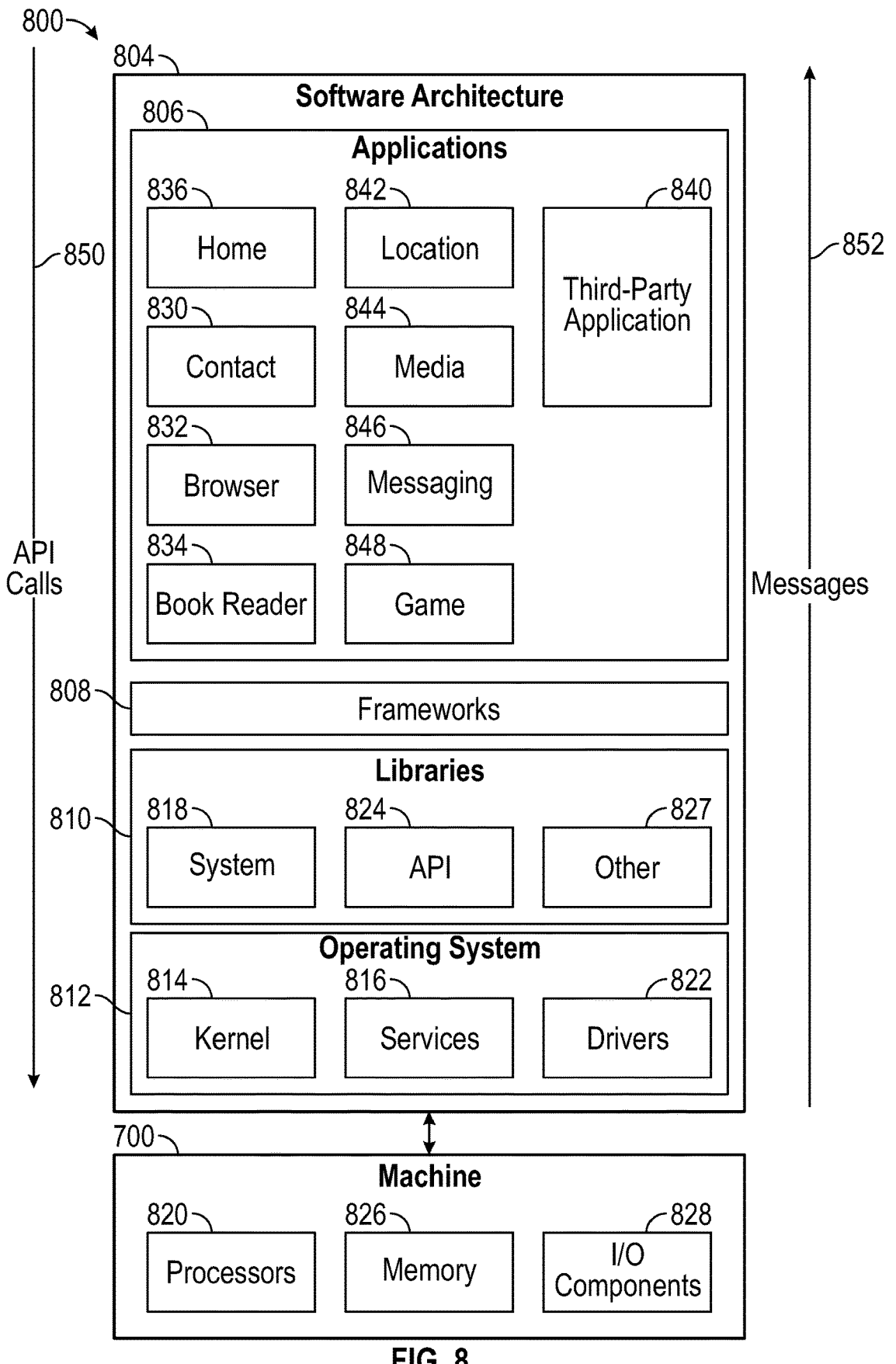
FIG. 8 is a block diagram showing a software architecture within which examples described herein may be implemented.

FIG. 8 is a block diagram 800 illustrating a software architecture 804, which can be installed on one or more of the devices described herein. The software architecture 804 is supported by hardware such as a machine 700 (see FIG. 7) that includes processors 820, memory 826, and I/O components 828. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 827 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to generate one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 840 can invoke the API calls 850 provided by the operating system 812 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component includes a general-purpose processor configured by software to become a special-purpose processor, the general-purpose processor may be configured as respectively different special-purpose processors (e.g., including different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method for determining a scale of an object with a mobile device, the method comprising:

capturing an image of the object using an object-facing camera of the mobile device in each of a first position and a second position;

capturing a first image at the first position of the mobile device with an away-facing stereo camera system;

capturing a second image at the second position of the mobile device with the away-facing stereo camera system;

estimating an away-facing relative pose of the away-facing stereo camera system from the first and second images;

obtaining an object-facing relative pose of the object-facing camera using the away-facing relative pose; and determining the scale of the object from the object-facing relative pose.

2. The method of claim 1, further comprising:

streaming video from the object-facing camera to a display of the mobile device;

developing an AR overlay including an item that is scaled using the scale of the object to overlay the object; and presenting the AR overlay on the display with the scaled item on or near the object.

3. The method of claim 1, wherein capturing the image of the object, the first image, and the second image comprises:

capturing concurrently the image of the object in the first position of the mobile device and the first image; and capturing concurrently the image of the object in the second position of the mobile device and the second image.

4. The method of claim 1, further comprising:

calibrating the object-facing camera of the mobile device with the away-facing stereo camera system.

5. The method of claim 4, wherein the away-facing stereo camera system includes a first away-facing camera and a second away-facing camera and wherein the calibrating comprises:

calibrating intrinsic parameters and distortion coefficients of each of the object-facing camera, the first away-facing camera, and the second away-facing camera;

calibrating an away-facing stereo camera system transformation between the first away-facing camera and the second away-facing camera; and calibrating an object-facing to away-facing stereo camera system transformation between the object-facing camera and one of the first away-facing camera or the second away-facing camera.

6. The method of claim 1, further comprising:

correcting for motion of the object between the image of the object captured with the mobile device in the first position and the image of the object captured with the mobile device in the second position.

7. The method of claim 1, wherein the first image and the second image are two-dimensional (2D) and wherein the estimating the away-facing relative pose comprises:

reconstructing a true-scale three-dimensional (3D) point cloud for the first position of the mobile device using the first image and the second image;

matching keypoints between the first image and the second image to establish correspondence between the keypoints in the second image and the 3D point cloud for the first position to generate a 2D to 3D correspondence; and estimating the away-facing relative pose based on the 2D to 3D correspondence.

8. The method of claim 7, wherein the estimating the away-facing relative pose based on the 2D to 3D correspondence comprises:

solving a perspective-n-point problem based on the 2D to 3D correspondence.

9. The method of claim 1, wherein the object is a face and wherein the obtaining the object-facing relative pose of the object-facing camera and the determining the scale of the object comprises:

transferring transformations between cameras of the away-facing stereo camera system to the object-facing camera with calibrated extrinsics between the away-facing stereo camera system and the object-facing camera, the transformations including a true-scale camera transformation;

detecting predefined face landmarks from the image of the object captured by the mobile device in the first position and the image of the object captured by the mobile device in the second position; and reconstructing a true-scale three-dimensional (3D) face from the predefined face landmarks using the true-scale camera transformation.

10. A mobile device for determining a scale of an object, the mobile device comprising:

an object-facing camera;

an away-facing stereo camera system; and a processor coupled to the object-facing camera and the away-facing stereo camera system, the processor configured to:

capture an image of the object using the object-facing camera in each of a first position and a second position of the mobile device;

capture a first image at the first position of the mobile device with the away-facing stereo camera system;

capture a second image at the second position of the mobile device with the away-facing stereo camera system;

estimate an away-facing relative pose of the away-facing stereo camera system from the first and second images;

obtain an object-facing relative pose of the object-facing camera using the away-facing relative pose; and determine the scale of the object from the object-facing relative pose.

11. The mobile device of claim 10, further comprising:

a display;

wherein the processor is coupled to the display and is further configured to:

stream video from the object-facing camera to the display;

develop an AR overlay including an item that is scaled using the scale of the object to overlay the object; and present the AR overlay on the display with the scaled item on or near the object.

12. The mobile device of claim 10, wherein to capture the image of the object, the first image, and the second image, the processor is configured to:

capture concurrently the image of the object in the first position of the mobile device and the first image; and capture concurrently the image of the object in the second position of the mobile device and the second image.

13. The mobile device of claim 10, wherein the processor is further configured to:

calibrate the object-facing camera of the mobile device with the away-facing stereo camera system.

14. The mobile device of claim 13, wherein the away-facing stereo camera system includes a first away-facing camera and a second away-facing camera and wherein to calibrate the object-facing camera of the mobile device with the away-facing stereo camera system the processor is configured to:

calibrate intrinsic parameters and distortion coefficients of each of the object-facing camera, the first away-facing camera, and the second away-facing camera;

calibrate an away-facing stereo camera system transformation between the first away-facing camera and the second away-facing camera; and calibrate an object-facing to away-facing stereo camera system transformation between the object-facing camera and one of the first away-facing camera or the second away-facing camera.

15. The mobile device of claim 10, wherein the processor is further configured to:

correct for motion of the object between the image of the object captured with the mobile device in the first position and the image of the object captured with the mobile device in the second position.

16. The mobile device of claim 10, wherein the first image and the second image are two-dimensional (2D) and wherein to estimate the away-facing relative pose the processor is configured to:

reconstruct a true-scale three-dimensional (3D) point cloud for the first position of the mobile device using the first image and the second image;

match keypoints between the first image and the second image to establish correspondence between the keypoints in the second image and the 3D point cloud for the first position to generate a 2D to 3D correspondence; and estimate the away-facing relative pose based on the 2D to 3D correspondence.

17. The mobile device of claim 16, wherein to estimate the away-facing relative pose based on the 2D to 3D correspondence the processor is configured to:

solve a perspective-n-point problem based on the 2D to 3D correspondence.

18. The mobile device of claim 10, wherein the object is a face and wherein to obtain the object-facing relative pose of the object-facing camera and to determine the scale of the object the processor is configured to:

transfer transformations between cameras of the away-facing stereo camera system to the object-facing camera with calibrated extrinsics between the away-facing stereo camera system and the object-facing camera, the transformations including a true-scale camera transformation;

detect predefined face landmarks from the image of the object captured by the mobile device in the first position and the image of the object captured by the mobile device in the second position; and reconstruct a true-scale three-dimensional (3D) face from the predefined face landmarks using the true-scale camera transformation.

19. A non-transitory computer-readable medium including instructions for determining a scale of an object with a mobile device, the instructions, when executed by a processor of the mobile device, configure the mobile device to:

capture an image of the object using an object-facing camera of the mobile device in each of a first position and a second position;

capture a first image at the first position of the mobile device with an away-facing stereo camera system;

capture a second image at the second position of the mobile device with the away-facing stereo camera system;

estimate an away-facing relative pose of the away-facing stereo camera system from the first and second images;

obtain an object-facing relative pose of the object-facing camera using the away-facing relative pose; and determine the scale of the object from the object-facing relative pose.

20. The non-transitory computer-readable medium of claim 19, wherein the instructions, when executed by the processor of the mobile device, further configure the mobile device to:

stream video from the object-facing camera to a display of the mobile device;

develop an AR overlay including an item that is scaled using the scale of the object to overlay the object; and present the AR overlay on the display with the scaled item on or near the object.

* * * * *